(12) United States Patent
Li et al.

(10) Patent No.: US 9,560,118 B2
(45) Date of Patent: *Jan. 31, 2017

(54) METHOD AND SYSTEM FOR PROVIDING CONTENT REMOTELY VIA ONE OR MORE IP MULTIMEDIA RESIDENTIAL GATEWAYS

(71) Applicant: Broadcom Corporation, Irvine, CA (US)

(72) Inventors: Gordon Yong Li, San Diego, CA (US); Xuemin Chen, Rancho Santa Fe, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,227

(22) Filed: Nov. 20, 2013

(65) Prior Publication Data

US 2014/0082141 A1 Mar. 20, 2014

Related U.S. Application Data

(63) Continuation of application No. 12/837,089, filed on Jul. 15, 2010, now Pat. No. 8,621,035.

(51) Int. Cl.
*G06F 15/16* (2006.01)
*H04L 29/08* (2006.01)
*H04N 21/61* (2011.01)
*H04N 21/63* (2011.01)
(Continued)

(52) U.S. Cl.
CPC ............. *H04L 67/10* (2013.01); *H04L 65/103* (2013.01); *H04L 65/40* (2013.01); *H04L 67/30* (2013.01); *H04L 67/303* (2013.01); *H04L 67/306* (2013.01); *H04N 21/6125* (2013.01); *H04N 21/632* (2013.01); *H04N 21/8355* (2013.01)

(58) Field of Classification Search
USPC .................. 709/217, 218, 219, 230, 231
See application file for complete search history.

(56) References Cited

U.S. PATENT DOCUMENTS

| | | | |
|---|---|---|---|
| 7,533,061 B1 * | 5/2009 | Cheng et al. | 705/50 |
| 2003/0158927 A1 * | 8/2003 | Sagey | H04L 12/2803 709/223 |
| 2008/0253444 A1 * | 10/2008 | Ho | 375/240.01 |

(Continued)

*Primary Examiner* — Liangche A Wang
(74) *Attorney, Agent, or Firm* — Foley & Lardner LLP

(57) ABSTRACT

An IP multimedia gateway (IMG) receives content sharing service profiles generated by a service manager for communication devices that are coupled to the IMG. Content and/or content information that is received for communication to a first device, is communicated to other devices in response to a request. Content sharing profiles comprise permissions, group members, user preferences, device capabilities and security profiles. Content streams communicated to the first device may be shared with a second device based on the profiles. The second device may share additional streams with the first device. The first device or other devices may communicate the request. The content may be received from a service manager network device. The IMG and a communication device that may display the content may be integrated in a set-top-box or digital TV. Login access is enabled to devices for requesting content. Cooperation with other IMGs may enable discovery and/or content communication.

20 Claims, 5 Drawing Sheets

(51) Int. Cl.
*H04N 21/8355* (2011.01)
*H04L 29/06* (2006.01)

(56) References Cited

U.S. PATENT DOCUMENTS

2011/0099263 A1* 4/2011 Patil et al. .................... 709/224
2011/0239287 A1* 9/2011 Pak et al. ........................ 726/10
2012/0260298 A1* 10/2012 Chen et al. ................... 725/114

* cited by examiner

METHOD AND SYSTEM FOR PROVIDING CONTENT REMOTELY VIA ONE OR MORE IP MULTIMEDIA RESIDENTIAL GATEWAYS

CROSS-REFERENCE TO RELATED APPLICATIONS/INCORPORATION BY REFERENCE

This application is a continuation of U.S. patent application Ser. No. 12/837,089 entitled "Method and System for Providing Content Remotely Via One or More IP Multimedia Residential Gateways," filed on Jul. 15, 2010, which also makes reference to U.S. patent application Ser. No. 12/829,145, which was filed on Jul. 1, 2010; U.S. patent application Ser. No. 12/829,179, which was filed on Jul. 1, 2010; U.S. patent application Ser. No. 12/829,212, which was filed on Jul. 1, 2010; and U.S. patent application Ser. No. 12/837,052, which was filed on Jul. 15, 2010.

Each of the above stated applications is hereby incorporated herein by reference in its entirety.

FIELD OF THE INVENTION

Certain embodiments of the invention relate to communication systems. More specifically, certain embodiments of the invention relate to providing content remotely via one or more IP multimedia residential gateways.

BACKGROUND OF THE INVENTION

Telecommunication technologies have evolved from analog to digital technologies, and continues to evolve from circuit switched to packet switched, from connection oriented packet switching to connectionless packet switching, and from narrow band application to broadband applications. The accompanied evolution in telecommunication technologies has significantly advanced operators' capability to offer broadband, IP-based multimedia services (IMS) ranging from entertainment and lifestyle applications such as mobile TV and mobile payment to professional services such as video conferencing and real-time data exchange.

IMS defines a standard framework for the deployment of next generation Web-based application services. IMS defines how these services connect and communicate with the underlying telecommunications network(s) and how they integrate with the network provider's back-end systems. IMS combines voice and data in one packet switched network such as, for example, the GPRS core network and the LTE core network, to offer network controlled multimedia services. Various Internet Protocols (IPs) such as the Session Initiation Protocol (SIP), the User Datagram Protocol (UDP), the Transmission Control Protocol (TCP) and Real-Time Transport Protocol (RTP) are widely utilized for delivery of various forms of multimedia applications over IP networks. SIP is an end-to-end application layer signaling protocol that is utilized to setup, modify, and teardown multimedia sessions such as audio/videoconferencing, interactive gaming, virtual reality, and call forwarding over IP networks. UDP and TCP are transport layer protocols that are used for data delivery over IP networks. TCP guarantees data delivery and integrity, however, UDP does not exclusively guarantee delivery of data. RTP is the Internet protocol which transmits real-time data such as audio and video data. RTP does not exclusively guarantee real-time delivery of data, but it does provide mechanisms for the sending and receiving applications to support streaming data.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for providing content remotely via one or more IP multimedia residential gateways.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for providing content remotely via one or more IP multimedia residential gateways. In an IP multimedia gateway one or more content sharing service profiles may be associated with one or more communication devices which are communicatively coupled to the IP multimedia gateway. The one or more content sharing service profiles may be generated by one or more service manager network devices. Content and/or information about the content, that is received for communication to at least a first of the communication devices, may be communicated, based on the received content sharing service profiles, to one or more of the other communication devices in response to a request from one or more of the communication device. One or more received content streams may be communicated to at least the first communication device based on the received content sharing service profiles. The first communication device may share the one or more received content streams with at least a second device. The second device may share one or more additional content streams with the first communication device. The content that is received for communication to the first communication device may be received from the one or more service manager network devices. The one or more received content sharing service profiles may comprise information about one or more of content sharing permissions, content sharing group members, user preferences, communication device capabilities and security profiles, for example.

Each of the one or more of the plurality of communication devices that are communicatively coupled to the IP multimedia gateway may be local with respect to the IP multimedia gateway or may be remote with respect to the IP multimedia gateway. The IP multimedia gateway may be integrated in, for example, a set-top-box, a digital television or a video device such as a video projector. In addition, one or more of the plurality of communication devices may be integrated within the set-top-box, the digital television or the video device such as the video projector; and may be operable to display the content. Login access may be enabled for one or more of the communication devices for submission of the request and/or for requesting information about content that one or more other of the communication devices is operable to consume. Cooperation with one or more other IP multimedia gateways may enable one or more of the discovery of other IP multimedia gateways, the discovery of one or more communication devices and the communication of the content and/or of the information about the content, based on the received content sharing service profiles. In this manner, an IP multimedia gateway may provide content to a plurality of local and/or remote communication devices.

Figure 1:
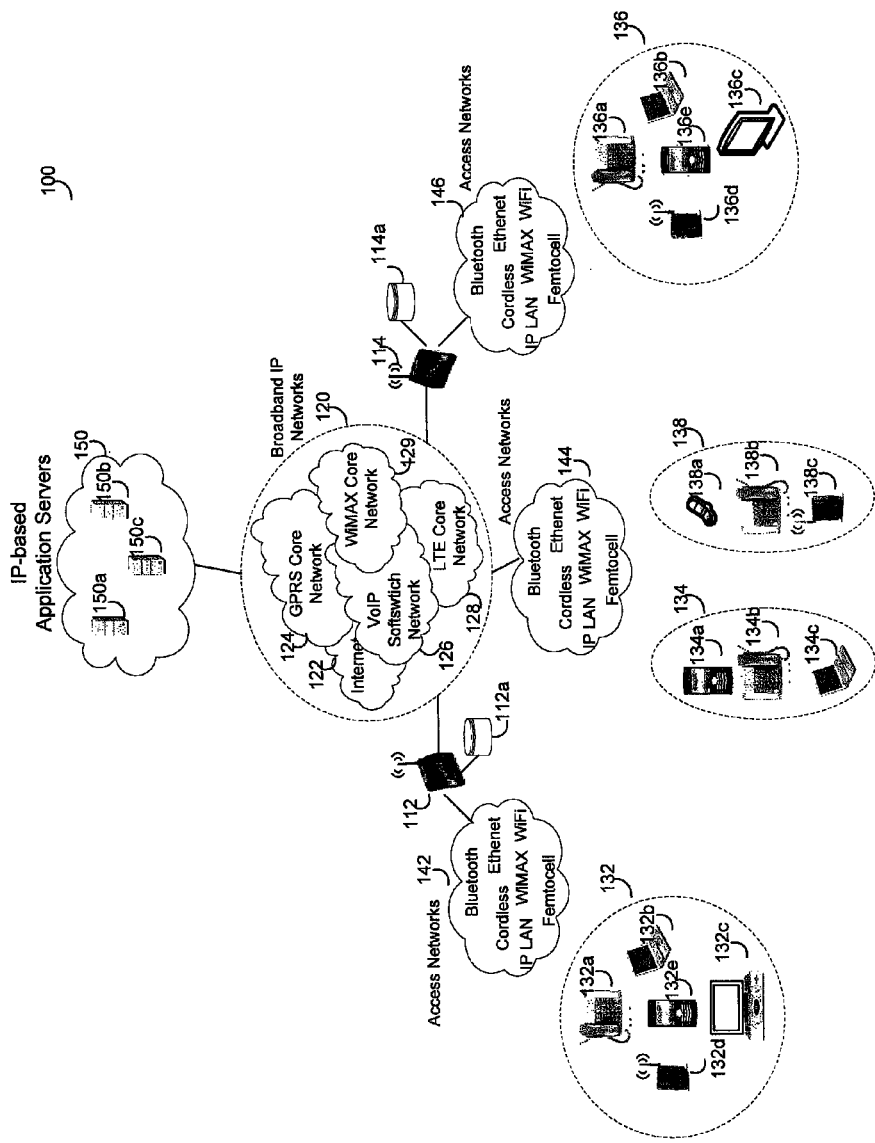
FIG. 1 is a diagram illustrating an exemplary communication system comprising an IP multimedia residential gateway that is operable to provide a content sharing service among local and remote communication devices, in accordance with an embodiment of the invention.

FIG. 1 is a diagram illustrating an exemplary communication system comprising an IP multimedia residential gateway that is operable to provide a content sharing service among local and remote communication devices, in accordance with an embodiment of the invention. Referring to FIG. 1, there is shown a communication system 100 comprising a plurality of IP multimedia residential gateways (IMRGs), of which IMRGs 112-114 are illustrated, broadband IP networks 120 comprising a plurality of core networks of which core networks 122-129 are shown, a plurality of communication devices 132a~132e, 134a~134c, 136a~136e, and 138a~138c, which may be referred to collectively herein as the communication devices 132, 134, 136 and 138, respectively, a plurality of access networks 142-146, and IP-based application servers 150, of which application servers 150a-150c are displayed.

The communication devices 132a~132e may be referred to as local devices with respect to the IMRG 112 and the communication devices 134a~134c, 136a~136e, and 138a~138c may be referred to as remote devices with respect to the IMRG 112. Similarly, the communication devices 136a~136e may be referred to as local devices with respect to the IMRG 114 and the communication devices 132a~132e, 134a~134c, and 138a~138c may be referred to as remote devices with respect to the IMRG 114. The communication devices 132, 134, 136 and 138 may be referred to as client devices with respect to the IMRGs 112 and/or 114.

In various embodiments of the invention, the IMRGs 112 and/or 114 may comprise suitable logic, circuitry, interfaces and/or code that may be operable to communicate content to the local and/or remote communication devices. For example, content may be received and/or stored in the IMRGs 112 and/or 114 prior to distribution to one or more of the communication devices 132, 134, 136 and/or 138. The content may be received by the IMRGs 112 and/or 114 from a service manager network device, an Internet application server and/or a recording and/or playback device. Notwithstanding, the invention is not limited with regard to any specific source of content. A service manager network device may be referred to as a service manager.

The IMRGs 112 and/or 114 may comprise suitable logic, circuitry, interfaces and/or code that may be operable to provide content sharing services to the communication devices 132, 134, 136 and/or 138. The IMRG content sharing services may enable a plurality of the communication devices to receive concurrently and/or at various delayed times, specified content via an IMRG. For example, IMRG content sharing services may enable one or more local and/or remote communication devices to receive content that is being consumed and/or is selected by another communication device. Moreover, IMRG content sharing services may enable one or more local and/or remote communication devices to receive information about which content is being consumed by and/or is selected by another communication device. For example, a user may be presently viewing video content such as a television program via an IMRG and the content may be distributed to another communication device via the IMRG and/or one or more other IMRGs. Alternatively, a communication device may be programmed to select and/or to receive content such as television content via an IMRG and a user may access the program from another communication device via the IMRG and/or one or more other IMRGs.

In an exemplary embodiment of the invention, a user of the communication device 132d may request via the IMRG 112, content and/or information about content that another local or remote communication device is consuming. For example, the communication device 132d may be operable to login to the IMRG 112 to see what content other local and/or remote devices are consuming and may request access to the content. Alternatively, a user of the communication device 132d may invite one or more other communication devices to consume the same content being consumed by the communication device 132d via the IMRG 112. In this manner, a plurality of communication devices may receive, for example, the same television program concurrently or at a delayed time. The IMRGs 112 and/or 114 may be operable to communicate a plurality of programs to one communication device such that a user may concurrently view their own choices of media in addition to media selected by a user of another communication device. For example, a display may be partitioned into a plurality of areas for concurrently viewing different streams of content. Audio for one of the areas may be selected by a user.

In various embodiments of the invention, a service manager may manage, control and/or may perform the content sharing services. The service manager may comprise one or more of the core networks 122-129, one or more of the IP-based application servers 150. The IMRG 112 and/or the IMRG 114 may perform content sharing services directed to the communication devices 132, 134, 136 and/or 138, under control and/or restrictions imposed by the service manager. The service manager may be operable to communicate content and/or may enable content sharing services for the communication devices 132, 134, 136 and/or 138 via the IMRGs 112 and/or 114.

The IMRGs 112 and/or 114 may be operable to receive content and/or control information from a service manager for distribution of the content to one or more of the plurality of the communication devices 132,134, 136 and/or 138. One or more of the plurality of communication devices 132, 134, 136 and/or 138 may be configured as a subscriber to the service manager. The service manager may configure and/or provision the IMRGs 112 and/or 114 utilizing one or more content sharing parameters. For example, the IMRGs may be configured with content sharing service permissions and/or subscriber and/or communication device content sharing profiles for enabling and/or controlling secure content sharing services among specified communication devices and/or among members of a group of communication devices. A communication device or subscriber profile may comprise information such as, for example, types of services and/or content that may be available to communication devices and/or may comprise access permissions for one or more communication devices.

A communication device and/or a subscriber profile may comprise information and/or configuration parameters associated with a specified communication device. The communication device and/or subscriber profiles may be utilized to enable content sharing services. For example, a profile for a specified communication device or a specified subscriber, may comprise parameters for user preferences, user permissions and/or a user service agreement profile that may be based on a service manager service agreement, for example. In this regard, a service agreement may indicate different classes of service to which a communication device or a user may subscribe. The service agreement and/or the classes of service may enable communication and/or sharing of content at appropriate data rates and/or at an appropriate quality of service for the specified subscriber and/or the communication device. Shared content may comprise, for example, streaming video and music, conversational voice, interactive gaming and/or 3D video. The communication devices 132, 134, 136 and/or 138 may also be configured for enabling and/or disabling secure content sharing. The IMRGs 112 and/or 114 may be operable to communicate information regarding the communication devices to the service manager. A service manager may be referred to as carrier or network operator equipment, for example.

An IMRG such as the IMRG 112 may comprise suitable logic, circuitry, interfaces and/or code that are operable to connect the communication devices 132a-132e to the broadband IP networks 120 for services of interest. A service may be described or represented by the service type and the service class. The type of a service refers to the type of information to be transferred, such as data, voice, text or radio for the service. A service with a given service type may be classified into a plurality of exemplary scheduling service classes, namely, data services for Internet access and messaging, conversational services for carrier-grade voice and/or video calls and conferences, video services for TV, video and music streaming, gaming services for users to interact with one another via a central server, and corporate VPN services for access to enterprise intranet/email. In addition, a service class for IMRG content sharing may be provided that may enable users to share television programs, video, music, voice, gaming and/or other content via an IMRG. The IMRG may provide content sharing services to local and/or remote communication devices where users may, for example, share content and/or may see which content other communication devices are consuming.

Specific requirements may be placed on access networks and core networks for each service type and/or class to ensure desired end-to-end QoS. The service requirements on access networks and core networks may comprise, for example, system timing, CODEC, transmission rates, power-saving mechanisms, security profiles and content types. The system timing may be utilized to synchronize communications for delivery of service. The CODEC may comprise G.711, G.729, G.723, MPEG-4, VC-1, and VP6, for example. The power-saving mechanisms may comprise various power levels, which may be utilized within certain time intervals, for service transmissions. The security profiles may comprise service security descriptions such as, for example, security configurations and policies. The security configuration of a service, for example, IMRG content sharing, may comprise protocols, credentials, and actions such as authentication actions. The content type of a service may specify what type of content that the service may comprise. The content type for a service may comprise, for example, Multipart Internet Mail Extensions (MIME) files, HTML pages, H.262, H.263, H.264/AVC video, G.711 voice, BV16, BV32 and DOCSIS Set-top Gateway (DSG) multimedia.

In various exemplary embodiments of the invention, the IMRG 112 may be operable to integrate local communication devices as well as remote communication devices to the broadband IP networks 120. Communication devices such as the communication devices 132a-132e that may access the IMRG 112 via device-dependent interfaces are referred to as local communication devices for the IMRG 112. A device-dependent interface may generally represent the PHY and MAC functionality of a particular access technology such as, for example, Ethernet, Wi-Fi, Bluetooth, cordless, and/or Femtocell. Communication devices such as the communication devices 132a-132e that may access the IMRG 112 via device-independent interfaces such as the broadband IP networks 120 are referred to as remote communication devices for the IMRG 112.

In various exemplary embodiments of the invention, for example, when communication devices are operable to share content with other local and/or remote communication devices, the IMRG 112 may be operable to perform automatic device and network discovery. In this regard, the IMRG 112 may be operable to utilize proprietary methods and/or well-known networking protocols such as uPnP and DHCP, or a combination of both to perform search, in the background or transparently, for attached communication devices and broadband IP networks. For example, the IMRG 112 may be operable to multicast a discovery message. The IMRG 112 may discover or identify attached devices and/or networks from responses received to the discovery message. In this regard, the IMRG 112 may be operable to retrieve or determine, from the received responses, communication device capabilities for the discovered devices, and/or network capabilities for the discovered networks. The communication device capabilities may comprise interface types, processing protocols, service types, service classes, service requirements and/or IMRG content sharing capabilities. The interface types for the identified device may comprise access interface types such as CDMA for GNSS, Multimedia over Coax Alliance (MoCa), WiFi, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Sockets Layer (SSL) and control protocols such as Spanning Tree Protocol (STP). The IP layer protocols may comprise IP signaling protocols such as SIP and H.323, and IP media transport protocols such as TCP, RTP, UDP, RTC, and RTCP. The link layer protocols may comprise technology-specific PHY and MAC layer protocols such as, for example, MoCA, WiFi, Ethernet, Femtocell, and/or cordless. With regard to IMRG content sharing capabilities, the communication devices may comprise content sharing resources and/or resource availability, content sharing permissions and/or restrictions and/or content sharing group information. The network capabilities may comprise interface types, processing protocols, service types, service classes and service requirements on network side. The interface types for the identified networks may comprise technology specific broadband IP connections such as DSL, Cable, FTTx, PLC and WiMAX. The protocols may comprise service layer protocols such as SSL and STP, technology-independent IP layer protocols such as SIP, TCP, and technology-dependent IP layer protocols such as Base Station System GPRS Protocol (BSSGP).

In various exemplary embodiments of the invention, the IMRG 112 may be operable to register discovered or identified communication devices and networks into a local database 112a. In this regard, the registered communication devices may comprise local communication devices such as the communication devices 132a-132e as well as remote communication devices such as the communication devices 134, 136 and/or 138. Information such as communication device capabilities and network capabilities may be stored in the local database 112a to support various applications or features. For example, the stored communication device capabilities may be utilized to implement the IMRG content sharing feature. In this regard, the IMRG 112 may be configured by a service manager and/or by a user, for example, with various permissions for sharing content among communication devices. Communication devices may be associated in groups that may be given permissions to share content among group members. Permissions may vary among various groups and/or various group members with regard to which content may be shared and/or reported.

In various exemplary embodiments of the invention, the IMRG 112 may be operable to access local communication devices utilizing device-dependent interfaces. In this regard, the IMRG 112 may be operable to support link layer protocols for specific PHY and MAC functionality of a particular access technology. For example, in instanced where the IMRG 112 is signaled to access a Bluetooth enabled communication device such as the communication device 132b, the IMRG 112 may be operable to communicate information with the communication device 132b utilizing Bluetooth air interface protocols.

The IMRG 112 may be operable to provide one or more common IP protocol-based interfaces towards communication devices. In this regard, the IMRG 112 may be comprise a common IP layer communication device interface to enable communication utilizing a wide range of communication devices to, for example, a single common IP transport protocol and a single common IP signaling protocol. For example, the IMRG 112 may be operable to convert or configure different IP transport protocols utilized by the communication devices 132a-132e into the single IP common transport protocol such as RTP. Different IP signaling protocols running on the communication devices 132a-132e may be converted into the single common IP signaling protocol such as SIP.

The IMRG 112 may be operable to route and distribute information such as media, signaling and event packets among communication devices registered to the IMRG 112. In this regard, the IMRG 112 may be operable to track registration status for communication devices dynamically registered as local clients or remote clients (during roaming). The IMRG 112 may be configured to monitor and/or discover communication device capabilities and network capabilities to dynamically configure registered communication device based on communication device capabilities and network capabilities.

The IMRG 112 may be operable to control or manage system timing and power-saving mechanisms for registered communication devices. For example, the IMRG 112 may be operable to adjust system timing based on corresponding service requirements for service deployment provided by different broadband IP networks over corresponding communication devices. For example, the IMRG 112 may be operable to manage power consumption on communication devices based on corresponding communication device capabilities and network capabilities to receive content of services offered by one or more service managers through different broadband IP networks.

The IMRG 112 may be operable to support various broadband connections such as, for example, DSL, Cable, FTTx, PLC and WiMAX. In this regard, the IMRG 112 may be operable to communicate with different broadband IP networks utilizing technology-dependent access for network access.

The IMRG 112 may be operable to dynamically configure one or more network interfaces within the IMRG 112 towards the broadband IP networks 120 for communicating with corresponding broadband IP networks. In this regard, the IMRG 112 may be configured to enable communication with different types of core networks by protocol mapping. For example, the IMRG 112 may be operable to convert a common IP media transport protocol such as RTP and a common IP signaling protocol such as SIP to different media transport and signaling protocols utilized by corresponding broadband IP networks.

The IMRG 112 may be operable to control or manage system timing and power-saving mechanisms for registered networks. For example, the IMRG 112 may be operable to adjust system timing based on corresponding service requirements for services provided by different broadband IP networks. For example, the IMRG 112 may be operable to control its own power levels and/or power consumption based on corresponding network capabilities to receive services from different broadband IP networks.

Although IP multimedia residential gateways (IMRGs) are illustrated in FIG. 1 for connecting communication devices through a common-protocol-based interface to broadband IP networks via a configurable interface, the invention is not so limited. Accordingly, other IP multimedia gateways for connecting communication devices through a common-protocol-based interface to broadband IP networks via a configurable interface may be supported without departing from the spirit and scope of various embodiments of the invention. The IP multimedia gateways may be located in a residential location and/or non-residential locations comprising, for example, a commercial building, an office, an office complex, an apartment building and/or a factory.

A communication device such as the communication device 132a may comprise suitable logic, circuitry, interfaces and/or code that are operable to receive services from different broadband IP networks through the IMRG 112. In various exemplary embodiments of the invention, the communication device 132a may be operable to utilize an access technology specific interface such as Bluetooth, LTE, WiFi and/or Ethernet to communicate with the IMRG 112 for services offered by different broadband IP networks. The communication device 132a may also be operable to communicate or exchange information with other communication devices registered to the IMRG 112. In this regard, the communication device 132a may share information, for example, multimedia content with local communication devices such as communication devices 132b-132e as well as remote communication devices such as the communication devices 134a-134c. The communication device 132a may be dynamically configured to receive services such from the broadband IP networks 120 as well as networked communication devices such as the communication device 132e.

An access network such as the access network 142 may comprise suitable logic, circuitry, communication devices, interfaces and/or code that are operable to communicate services utilizing various access technologies such as, for example, IP LAN, Bluetooth, WiFi, Femtocell, LTE and WiMAX.

An IP-based application server 150 such as the IP-based application server 150a may comprise suitable logic, circuitry, interfaces and/or code that are operable to provide IP-based services to various broadband IP networks 120. In this regard, the IP-based application server 150a may be configured to deliver carrier-grade as well as non-carrier-grade broadband access services to users through the broadband IP networks 120. The IP-based application server 150a may be operable to schedule delivery of carrier-grade services to ensure service integrity. No-carrier-grade services may be delivered when needed without reliability and stability ensured.

In various embodiments of the invention, one or more of the IP-based application servers 150 may comprise service manager network equipment that may be operable to provide content, such as, television programming, video, music, voice and/or gaming content to the IMRGs 112 and/or 114 for distribution to the communication devices 132, 134, 136 and/or 138. For example, one or more of the IP-based application servers 150 may comprise service manager network equipment. Furthermore, one or more of the IP-based application servers 150 may function as a service manager "head-end," which may provide multimedia services to the IMRGs 112 and/or 114 and/or to the communication devices 132, 134, 136 and/or 138. The multimedia services may comprise streaming and/or downloading of content such as television programming, film, gaming, video, and/or audio content for use in communication devices. The multimedia services may be delivered to communication devices via IMRGs such as the IMRGs 112 and/or 114. For example, the content may be delivered to the IMRG 112 via one or more of the broadband IP networks 120 and/or via other IMRGs such as the IMRG 114. The IMRGs 112 and/or 114 may be operable to distribute the shared content to one or more local communication devices and/or to one or more remote communication devices via the broadband IP networks 120 and/or via one or more other IMRGs. The service manager may be operable to control which communication devices 132, 134, 136 and/or 138 may have permission to receive the shared content. In addition, the service manager may be operable to bill communication device users and/or other entities, for access to the shared content and/or for access to information about the shared content. In various embodiments of the invention, an IMRG such as the IMRG 112 may receive content from an IP based application server 150 and may forward the content to another IMRG such as the IMRG 114 for distribution to one or more communication devices that are local to the IMRG 114, such as the communication device 136b.

The communication devices 132, 134, 136 and 138 may comprise suitable logic, circuitry, interfaces and/or code that may be operable to receive and/or display content communicated from IMRGs such as the IMRGs 112 and/or 114. The communication devices 132, 134, 136 and/or 138 may be operable to access and/or interact with local and/or remote IMRGs such as the IMRGs 112 and/or 114 to select content and/or to utilize IMRG content sharing services. In this regard, a first communication device may be operable to access a local or remote IMRG and may request content that may be currently consumed and/or selected by a second communication device. For example, the communication device 134c may request content from the IMRG 112, which is being consumed by the communication device 132b via the IMRG 112. In instances when permission is granted to the communication device 134c for sharing the content, the IMRG 112 may stream the content to the communication device 134c via the broadband networks 120.

Alternatively, a first communication device may be operable to invite a second local or remote communication device to "share" or receive content that is consumed and/or selected by the first communication device. The content may be delivered to the first and second device via an IMRG that is serving content to the first communication device. The communication devices 132, 134, 136 and/or 138 may be operable to access local and/or remote IMRGs 112 and/or 114 via the broadband IP networks 120. For example, the communication device 136c, which may comprise a video client, may select and/or may be currently consuming a television program. The communication device 136c may invite the communication device 132e which may also comprise video capabilities, to share or receive the same content. In instances when the communication device 132e may be configured with permission to share content being consumed or selected by the communication device 136c, the IMRG 114 may communicate the content to the communication device 132e via the broadband IP networks 120 and/or via the IMRG 112. The IMRG 114 may concurrently communicate the content to the communication device 136c. Furthermore, a plurality of communication devices may request content and/or may be invited to share content from another communication device. The communication devices 132, 134, 136 and/or 138 may be operable to display a plurality of video streams concurrently and/or may enable users to select audio from one of the plurality of video streams.

In an exemplary operation, an IMRG such as the IMRG 112 may comprise a stand-alone device or may be embedded and/or integrated within another device. For example, an IMRG may be integrated within a set-top-box and/or a digital television and may be coupled to a video communication device. Furthermore, an IMRG may be installed in any suitable location such as residence or enterprise environment. For example, an IMRG may be located at a residential property where one or more users, such as a family may be served by the IMRG. Alternatively, an IMRG may be installed in a location where a plurality of residences or a community of users may be able to access the IMRG with communication devices that may operate as local communication devices with respect to the IMRG.

An IMRG such as the IMRG 112 may be operable to communicatively couple a plurality of communication devices to the broadband IP networks 120. Communication devices discovered by the IMRG 112 may be registered together with corresponding communication device capabilities into the local database 112a to support applications such as content sharing services. The IMRG 112 may serve local communication devices such as the communication devices 132a-132e as well as remote communication devices such as the communication devices 134a-134c. Local communication devices may communicate with an associated IMRG over device-dependent interfaces such as IP LAN, Bluetooth, WiFi, Femtocell, LTE and WiMAX. Remote communication devices may exchange or communicate information with an associated IMRG over device-independent interfaces such as, for example, the broadband IP networks 120. A communication device such as the communication device 132a may initially register as a local communication device and become a remote communication device to the IMRG 112 when the communication device 132a roams outside of a local coverage area served by the IMRG 112. Similarly, a communication device such as the communication device 134a may initially register on the IMRG 112 as a remote communication device. In instances where the communication device 134a moves into the local coverage area of the IMRG 112, the remote communication device may be registered as a local communication device.

In an exemplary operation, IMRGs such as the IMRG 112 and/or IMRG 114 may be configured by a service manager for providing secure content sharing services to one or more communication devices such as the communication devices 132, 134, 136 and/or 138. In addition, the IMRGs 112 and/or 114 may receive content and/or control information from the service manager to enable the secure content sharing services by the IMRGs. IMRG content sharing services may comprise routing content that is being consumed and/or selected by one communication device to one or more other local and/or remote communication devices. Moreover, information about content being consumed by a communication device may be routed to other communication devices. For example, a user may be viewing a television program on the communication device 136c via the IMRG 114. The IMRG 114 may be operable to communicate the same television program and/or information about the program to other communication devices comprising 132b, 134c and 136e, for example. Communication devices such as the communication devices 132, 134, 136 and/or 138 may be configured with permission parameters to receive content sharing services from the IMRGs 112 and/or 114.

The IMRGs 112 and/or 114 and/or the communication devices 132, 134, 136 and/or 139 may be configured with parameters such as permissions and profiles for content sharing services. The IMRGs 112 and/or 114 may be operable to discover IMRGs and/or local and/or remote communication devices that may be operable to receive IMRG content sharing services. In various embodiments of the invention, the IMRGs 112 and/or 114 may be operable to coordinate content sharing services among IMRGs and/or with service managers. Communication device profiles and/or user profiles may be utilized by the IMRGs 112 and/or 114 to determine which content sharing services, permissions, preferences, communication device capabilities and/or resources may apply to a communication device for content sharing. The information in the communication device profiles may be determined and/or configured by one or more of a service manager, a user, an IMRG and/or a communication device. In an exemplary embodiment of the invention, a plurality of communication devices may comprise a content sharing service group. In this regard, communication devices within a group may be operable to request content and/or information about content that another communication device within the group may be currently consuming or may have selected for consumption. Various groups and/or group members may have different levels of content sharing permissions. For example, a user and/or a service manager may specify which content may be shared with which communication devices. Also, a user and/or a service manager may specify whether content being consumed and/or selected by a first communication device may be delivered to one or more other communication devices and/or whether information such as text about the content may be delivered to the one or more other communication devices. Furthermore, communication devices may be operable to make content which they consume, openly available to any other suitable communication devices. In this regard, content sharing may not be restricted and may be available for access without specific permissions.

In various embodiments of the invention, communication devices such as one or more of the communication devices 132, 134, 136 and/or 138 may be operable to request access to content being consumed by and/or selected by another communication device. Alternatively, one or more of the communication devices 132, 134, 136 and/or 138 may be invited to receive content being consumed by and/or selected by other communication devices. The communication devices may be operable to display a plurality of content streams concurrently. For example, a user may view a personally selected video image on the communication device 136c in one portion of a video display and may select to additionally view a video image from the communication device 132c in a second portion of the video display and a third video image from the communication device 134c in a third portion of video display.

Figure 2:
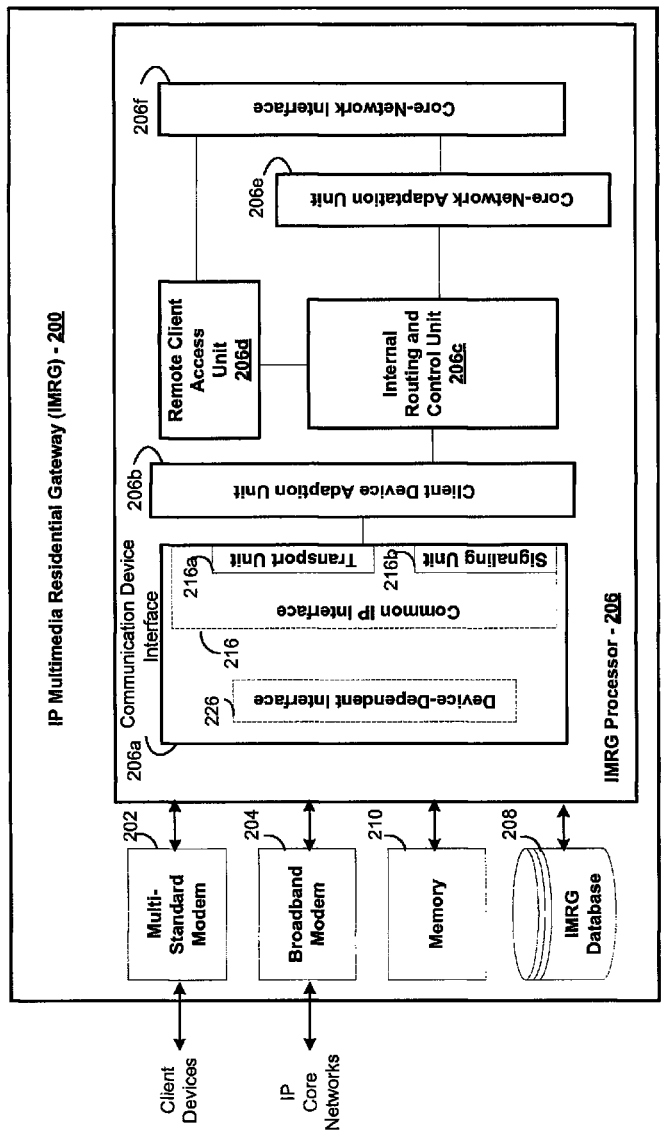
FIG. 2 is a diagram illustrating an exemplary IP multimedia residential gateway that is operable to manage content sharing among local and remote communication devices, in accordance with an embodiment of the invention.

FIG. 2 is a diagram illustrating an exemplary IP multimedia residential gateway that is operable to manage content sharing among local and remote communication devices, in accordance with an embodiment of the invention. Referring to FIG. 2, there is shown an IP multimedia residential gateway (IMRG) 200 comprising a multi-standard modem 202, a broadband modem 204, an IMRG processor 206, an IMRG database storage 208 and a memory 210.

The IMRG 200 may be similar and/or substantially the same as the IMRG 112 and/or the IMRG 114. Furthermore, the IMRG 200 may be a stand alone device or may be integrated within another device, for example, within a set-top-box, a digital television and/or a video device such as a video projector that may comprise a video display client of the IMRG 200.

The multi-standard modem 202 may comprise suitable logic, circuitry, interfaces and/or code that are operable to communicate with a plurality of communication devices such as the communication devices 132a-132e and 134a-134c utilizing a device-dependent interface such as, for example, Ethernet, Wi-Fi, Bluetooth, cordless, and/or Femtocell.

The broadband modem 204 may comprise suitable logic, circuitry, interfaces and/or code that are operable to transmit voice and/or data in adherence with one or more internet protocol (IP) broadband standards. The broadband modem 204 may be operable to transmit and/or receive voice and/or data to and/or from the broadband IP networks 120 over broadband connections such as, for example, T1/E1 line, DSL, Cable, FTTx, PLC and WiMAX. The broadband modem 204 may dynamically configure one or more network interfaces utilized within the broadband modem 204 for communication with the broadband IP networks 120. For example, in instances where the broadband modem 204 is signaled to exchange information with the VoIP softswitch network 126, the broadband modem 204 may be configured to utilize FTTx as an access solution to the VoIP softswitch network 126.

The IMRG processor 206 may comprise suitable logic, circuitry, interfaces and/or code that are operable to perform a variety of signal processing tasks to maintain or manage communication between associated communication devices such as the communication devices 132a-132e and 134a-134c and the broadband IP networks 120, and/or among the associated communication devices. The IMRG processor 206 may comprise a communication device interface 206a, a communication device adaptation unit 206b, an internal routing and control unit 206c, a remote access unit 206d, a core-network adaptation unit 206e and a core-network interface 206f.

The communication device interface 206a may comprise suitable logic, circuitry, interfaces and/or code that are operable to perform protocol conversion for communication device access. The communication device interface 206a may comprise a device-dependent interface 226 and a common IP interface 216. The device-dependent interface 226 may comprise suitable logic, circuitry, interfaces and/or code that are operable to access local communication devices over device-dependent connections such as WiFi and LTE connections. The device-dependent interface 226 may be operable to support link layer protocols for specific PHY and MAC functionality of a particular access technology. For example, in instances where the communication device interface 206a is signaled to access a WiFi enabled communication device such as the communication device 132c, the communication device interface 206a may exchange information with the communication device 132c utilizing WiFi air interface protocols for corresponding link layer communication. The device-dependent interface 226 may support different IP transport and/or signaling components utilized by communication devices. The common IP interface 216 may comprise suitable logic, circuitry, interfaces and/or code that are operable to provide a common IP support to communicate content between various communication devices and the broadband IP networks 120. The common IP interface 216 may comprise a transport unit 216a and a signaling unit 216b. The transport unit 216a may comprise suitable logic, circuitry, interfaces and/or code that are operable to provide a single IP transport component such as RTP to support data communication over IP. The signaling unit 216b may comprise suitable logic, circuitry, interfaces and/or code that are operable to provide a single IP signaling component such as SIP to support signaling communication over IP. The communication device interface 206a may perform protocol mapping or translation between different IP transport and/or signaling components utilized by communication devices and the common IP-based interface 216 running on the IMRG processor 206.

The communication device adaptation unit 206b may comprise suitable logic, circuitry, interfaces and/or code that are operable to adapt a wide range of communication devices. In this regard, the communication device adaptation unit 206b may be operable to perform, for example, media or content transcoding, rate conversion, system timing adjustment and/or power control based on corresponding communication device capabilities to improve user experiences.

The internal routing and control unit 206c may comprise suitable logic, circuitry, interfaces and/or code that are operable to route and distribute content for use in content sharing services, signaling and event packets among communication devices registered to the IMRG 112, for example. In this regard, the internal routing and control unit 206c may be operable to keep track of registration status for associated communication devices. In instances where a communication device such as the communication device 132a is within a local area served by the IMRG 112, the internal routing and control unit 206c may be operable to register the communication device 132a in the IMRG database storage 208 as a local communication device of the IMRG 112. In instances where a local communication device such as the communication device 134a roams outside of the local coverage area, the internal routing and control unit 206c may register the communication device 134a in the IMRG database storage 208 as a remote communication device for the IMRG 112. The internal routing and control unit 206c may collect and/or track communication device capabilities for associated communication devices and network capabilities to build the IMRG database storage 208. The internal routing and control unit 206c may be operable to dynamically configure associated communication devices based on collected system capability information. In addition, the internal routing and control unit 206c may be operable to coordinate or control system timing adjustment and power control management for delivery of service.

The routing and control unit 206c may comprise suitable logic, circuitry, interfaces and/or code that may be operable to collect information that may be utilized for content sharing services and may store the information in the IMRG database storage 208. For example, communication device and/or user profiles that may comprise content sharing permissions, communication device capabilities, user preferences and/or content sharing communication device groups may be stored in the IMRG database storage 208. In addition, multimedia content and/or control information may be stored in the IMRG database storage 208 and/or may be associated with the communication devices and/or users. The collected information may be retrieved from a service manager or "head-end", from communication devices and/or from other IMRGs, for example.

The remote access unit 206d may comprise suitable logic, circuitry, interfaces and/or code that are operable to provide necessary functionality for the support of remote access by communication devices that are roaming outside of a local coverage of the IMRG 112. In this regard, the remote access unit 206d may be operable to exchange information with remote communication devices over broadband connections to the broadband IP networks 120. Content may be distributed from the IMRG 200 to remote communication devices via one or more of the broadband IP networks 120, the IMRGs 112 and/or 114 and/or the access networks 142, 144 and/or 146. Moreover, the remote access unit 206d may handle requests for sharing content with remote communication devices.

The core-network adaptation unit 206e may comprise suitable logic, circuitry, interfaces and/or code that are operable to provide adaptation to different broadband IP networks for various communication devices. In this regard, the core-network adaptation unit 206e may perform, for example, protocol translation and mapping between a common IP protocol utilized by the IMRG 200 and protocols used by different broadband IP networks.

The core-network interface 206f may comprise suitable logic, circuitry, interfaces and/or code that are operable to provide various broadband connections such as, for example, DSL, Cable, FTTx, PLC and WiMAX for access to the broadband IP networks 120.

The IMRG database storage 208 may comprise suitable logic, circuitry, interfaces and/or code that are operable to store and manage communication device information and network information. In this regard, the IMRG database storage 208 may comprise registration status information for associated communication devices. The registration status for a communication device pertaining to the IMRG 200 may be a local communication device or a remote communication device. The IMRG database storage 208 may be operable to keep track of or collect communication device and network capabilities. The collected capability information may be utilized to dynamically configure communication devices pertaining to the IMRG 200. In addition, the IMRG database storage 208 may be operable to store local and/or remote communication device information, content information, content sharing configuration parameters and/or data that may enable the IMRG 200 to communicate shared content to local and/or remote communication devices. For example, content information may identify content, may comprise security information for secure content sharing and/or may comprise characteristics of the multimedia content that may be stored in the IMRG database storage 208. Also, content sharing permissions for communication devices and/or user preferences may be stored in the IMRG database storage 208. Various information such as permissions, user and/or communication device profiles and/or multimedia content utilized in content sharing services may be received from a service manager, for example, from service provider "head-end" equipment. The information may be updated over time. The IMRG database storage 208 may comprise RAM, ROM, low latency nonvolatile memory such as flash memory and/or other suitable electronic data storage capable of storing data and instructions.

The memory 210 may comprise suitable logic, circuitry, interfaces and/or code that are operable to store and manage data and/or other information utilized by the IMRG processor 206. For example, the memory 210 may be utilized to store processed data or content generated by the IMRG processor 206. The memory 210 may be enabled to store executable instructions to process, for example, protocol mapping and/or media transcoding. The memory 210 may comprise RAM, ROM, low latency nonvolatile memory such as flash memory and/or other suitable electronic data storage capable of storing data and instructions.

In an exemplary operation, a service manager may configure the IMRG 200 for providing content sharing services. The communication devices 132, 134, 136 and/or 138 may allow subscribers to access services such as content sharing, which may be offered by the service manager. The IMRG 200 may be operable to communicate information to the service manager regarding content sharing among the communication devices. For example, usage and/or billing information, communication device service requests, communication device capabilities and/or communication device resource availability may be communicated to the service manager. The service manager may communicate multimedia content, content sharing permissions, user preferences and/or communication device profiles, for example, to the IMRG 200 such that the IMRG 200 may be operable to provide content sharing services in accordance with the service manager's policies.

The IMRG 200 may be operable to store communication device information such as multimedia content, permissions, communication device capabilities, content sharing groups and/or user preferences, for different communication devices in the IMRG database storage 208 for use in providing content sharing services. The IMRG 200 may be operable to provide content sharing services to local and/or remote communication devices. The IMRG 200 may receive content for distribution and/or sharing from a service manager "head-end" and/or from an IP based application server 150, for example, via the common IP interface 216. In addition the IMRG 200 may receive content from a media recorder and/or playback device, for example, for content sharing distribution. The IMRG 200 may be operable to enable local and/or remote communication devices to login to the IMRG 200 to request content and/or information about content that other communication devices may consume.

The IMRG 200 may be operable to communicate with local communication devices 132, 134, 136 and/or 138 utilizing the device-dependent interface 226 and the multi-standard modem 202. For example, the IMRG 200 may be operable to utilize the device dependent interface 226 and/or the multi-standard modem 204 for sending and/or receiving content sharing requests and/or for distribution of content, to local communication devices.

The IMRG 200 may be operable to access the broadband IP networks 120, remote communication devices 132, 134, 136, 138 and/or the IP based application servers 150 utilizing the common IP interface 216 and the broadband modem 204. For example, the IMRG 200 may receive control information and/or content from a service manager and may distribute the content to remote communication devices via the IP interface 216 and the broadband modem 204. For example, the IMRG 200 may be operable to communicate via various broadband access technologies such as DSL, Cable, FTTx, PLC and WiMAX supported by the core-network interface 206f.

The internal routing and control unit 206c may be operable to control communication of content to the local and/or remote communication devices 132, 134, 136 and/or 138 in order to distribute shared content. The internal routing and control unit may utilize content sharing permissions, communication device capabilities, user preferences and/or content sharing communication device groups for controlling content sharing among the communication devices.

Figure 3:
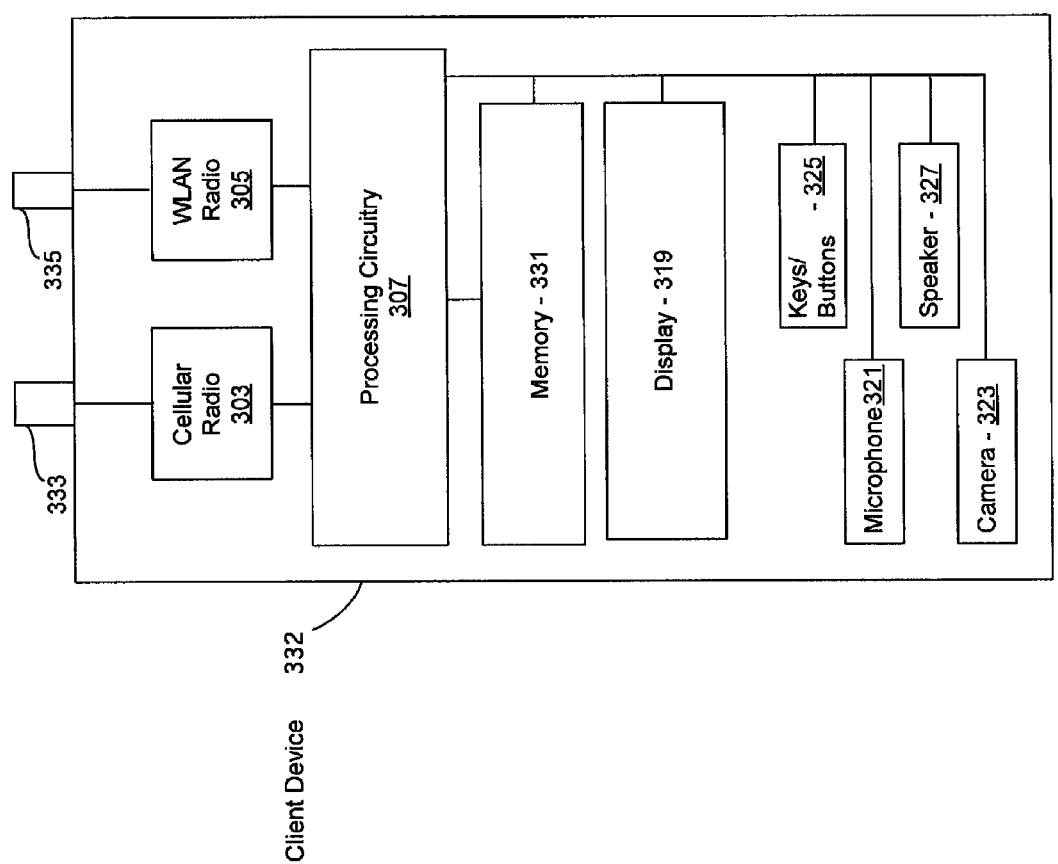
FIG. 3 is a diagram illustrating an exemplary communication device that may be operable to request and receive IP multimedia gateway content sharing services, in accordance with an embodiment of the invention.

FIG. 3 is a diagram illustrating an exemplary communication device that may be operable to request and receive IP multimedia gateway content sharing services, in accordance with an embodiment of the invention. Referring to FIG. 3, there is shown the communication device 132d that comprises a cellular radio 303, a wireless local area network (WLAN) radio 305, a processing module 307, a memory 331, a display 319, a microphone 321, a camera 323, keys and buttons 325, a speaker 327, a cellular antenna 333 and WLAN antenna 305.

The communication device 332 may be similar or substantially the same as the communication device 132d described with respect to FIG. 1, for example.

The cellular radio 303 may comprise suitable logic circuitry interfaces and/or code that may enable transmission and reception of RF cellular signals via the antenna 333. The cellular radio 303 is not limited to any specific type of wireless technology and may utilize any suitable wireless technology, for example, GSM, CDMA, WCDMA, OFDMA, LTE and WIMAX. In addition, the cellular radio 303 may be operable to exchange signals with the processing module 307 for baseband processing. The communication device 332 may be operable to communicate with the IMRG 112, for example, via the cellular radio 303 and/or one or more of the access networks 142. The communication device 332 may be operable to communicate requests for content sharing and/or may receive shared content from an IMRG via the cellular radio 303, for example.

The WLAN radio 305 may comprise suitable logic, circuitry interfaces and/or code that may be operable to perform transmission and/or reception of RF signals for the communication of data traffic via the antenna 335. In addition, the WLAN radio 305 may be operable to exchange data with the processing module 307 for baseband processing. Communication via the WLAN radio 305 may be based on any suitable data communication standard such as, for example, various IEEE 802.11 and/or Wi-Fi Alliance standards. The communication device 332 may be operable to communicate with the IMRG 112, for example, via the WLAN radio 305 and/or one or more of the access network 142. The communication device 332 may be operable to communicate requests for content sharing and/or may receive shared content via the WLAN radio 305. The communication device 332 may have additional radio and/or tethered communication interfaces for communication with an IMRG and/or with other communication devices.

The processing module 307 may comprise suitable logic, circuitry, interfaces and/or code that may be operable to process baseband communication signals and may support services provided by one or more IMRGs. For example, the processing module 307 may handle content sharing services with the IMRG 112. The processing module 307 may submit requests to the IMRG 112 for receiving content that may be consumed and/or selected by another communication device. The processing module 307 may also submit requests to the IMRG 112 to invite another communication device to receive or share content that is being consumed and/or is selected by the communication devices 332. In various embodiments of the invention, the communication device 332 may be protected by secure operations. In this regard, the processing module 307 may comprise a security processor to control secure communication and/or to protect secure content between the communication device 332 and one or IMRGs and/or one or more other communication devices.

The memory 331 may comprise suitable logic, circuitry interfaces and/or code that may be operable to provide storage for instructions and data for tasks performed by the communication device 332. The memory 331 may comprise communication device and/or user profiles that may be utilized to enable content sharing services. The memory 331 may comprise ROM and/or flash memory, for example.

The communication device 332 may comprise a plurality of human interfaces that may be utilized for capturing communication information and for interfacing with various features such as content sharing. For example the communication device 332 may comprise a display 319 and speaker 327 that produce images and/or sound for cellular communication and/or for rendering multi-media, for example. The display 319 may be operable to visually display content that a user of the communication device 332 selects from a service provider or the Internet, for example, as well as content that may be shared from another communication device and received via one or more IMRGs. The microphone 321 and camera 323 may be utilized for voice calling and/or for capturing and storing multi-media data, for example. The keys and/or buttons comprise a keyboard and/or number entry for creating messages and/or interfacing with communication device 332 features. In various embodiments of the invention, other types of human interfaces may be utilized. For example, touch screen, voice and/or pressure sensors are utilized for inputting information.

In an exemplary operation, the communication device 332 may be configured to receive content sharing services from an IMRG, such as the IMRG 112. A user of the communication device 332 may select content from a service manager. The service manager may deliver the content to the IMRG 200 for distribution to the communication device 332 and/or for distribution to other communication devices during content sharing services. The IMRG 112 may receive the content and may deliver the content to the communication device 332. A user may display the content on the display 319. A user may request that the content be communicated to one or more other local or remote communication devices, for example, to the communication device 132*a* and/or to the communication device 136*c*. In instances when the other communication devices have permission to receive the content, the IMRG 112 may distribute the content to the other communication devices.

In various embodiments of the invention, a user that may be receiving content at the communication device 332 may invite one or more other communication device to receive the content. In other embodiments of the invention, a user of the communication device 332 may request to receive content that is being received by one or more other communication devices. Also in various exemplary embodiments of the invention, rather than distributing content to other communication devices, an IMRG may communicate only information about the content to the other devices.

Figure 4:
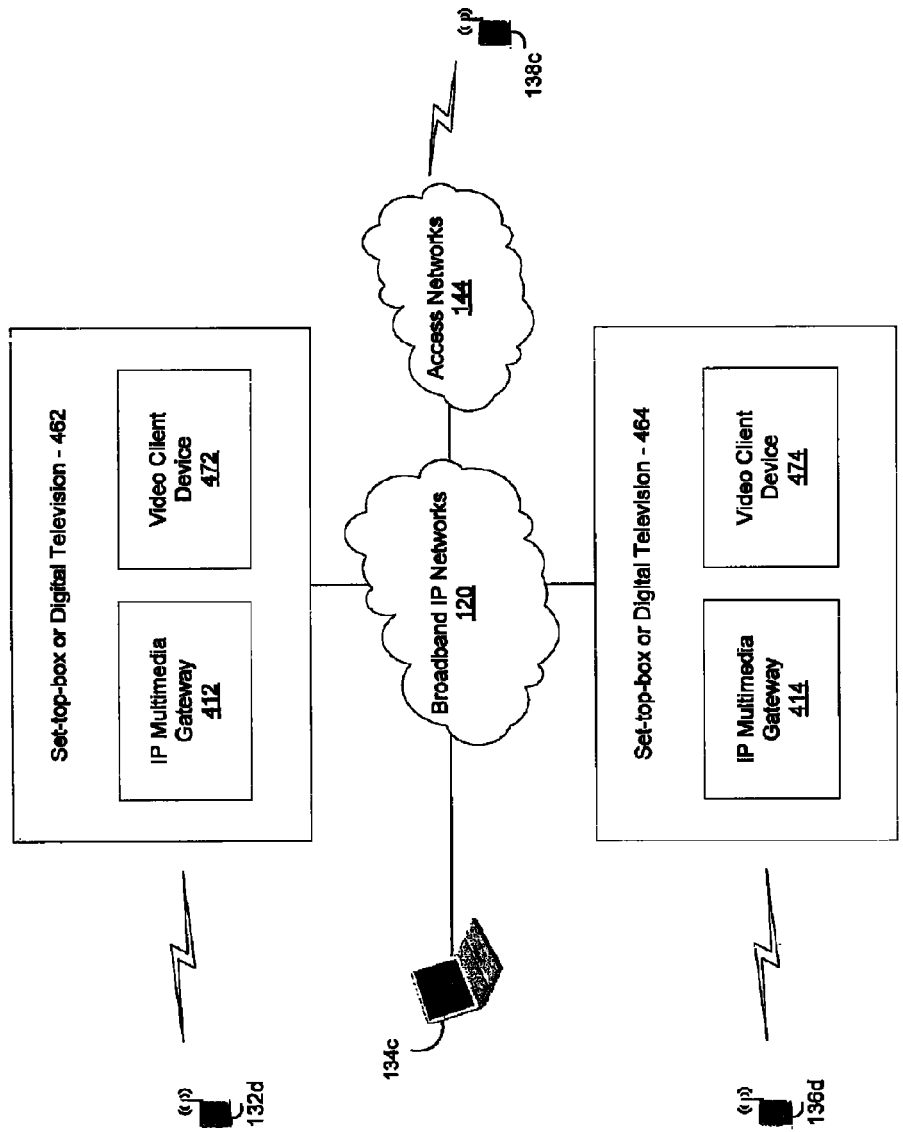
FIG. 4 is a diagram illustrating an exemplary IP multimedia residential gateway content sharing system, in accordance with an embodiment of the invention.

FIG. 4 is a diagram illustrating an exemplary IP multimedia residential gateway content sharing system, in accordance with an embodiment of the invention. Referring to FIG. 4, there is shown a set-top-box and/or digital television (STB/DTV) 462 which may comprise an IP multimedia residential gateway (IMRG) 412, and a video client device 472. Also there is shown an STB/DTV 464 which may comprise an IMRG 414 and a video client device 474. The broadband IP networks 120, the access networks 144 and the communication devices 132*d*, 136*d*, 134*c* and 138*d* are also shown.

The IMRGs 412 and/or 414 may be similar and/or substantially the same as the IMRGs 112, 114 and/or 200. The communication devices 132*d*, 136*d*, 134*c* and 138*d* are described with respect to FIG. 1.

The STB/DTV 462 and the STB/DTV 464 may each comprise a set-top-box, digital television and/or a video device such as a video projector, for example. The STB/DTV 462 may comprise the IMRG 412 and the video client device 472 which may be communicatively coupled. The STB/DTV 464 may comprise the IMRG 414 and the video client device 474 which may be communicatively coupled.

The IMRG 412 may be communicatively coupled to the communication device 132*d* which may be a local device with respect to the IMRG 412. The communication device 132*d* may communicate with the IMRG 412 based on any suitable access technology, for example, WLAN, WiFi and/or a tethered technology. The communication devices 134*c*, 138*c*, 136*d* and the video client device 474 may be remote devices with respect to the IMRG 412. The IMRG 412 may be communicatively coupled to the communication device 134*c* via the broadband IP networks 120. The IMRG 412 may be communicatively coupled to the communication device 138*c* via the broadband IP networks 120 and the access networks 144. The communication device 136*d* may be communicatively coupled to the IMRG 412 via the broadband IP networks 120 and the IMRG 414, for example. The video client device 474 may be communicatively coupled to the IMRG 412 via the IMRG 414 and the broadband IP networks 120, for example. Similarly, the communication device 136*d* may be a local device with respect to the IMRG 414 and the communication devices 132*d*, 134*c*, 138*c* and the video client device 474 may be remote devices with respect to the IMRG 414.

The video client devices 472 and/or 474 may comprise suitable logic, circuitry, interfaces and/or code that may be operable to receive video and/or services from one or more of a cable or satellite service manager and/or a video recorder and/or playback device, for example. Exemplary service manager services may comprise video, music, voice, gaming and/or other products for purchase, security services and/or video recording services. In various embodiments of the invention, the video client devices 472 and/or 474 may be operable to process content such as 2D and/or 3D video, audio and/or graphics data. The video client devices 472 and/or 474 may be operable to display multimedia on a display panel and/or by a video projection device, for example. One or both of the video client devices 472 and/or 474 may be operable to support content sharing services. For example, a user may input commands such as requests for content sharing services, utilizing the video client devices 472 and/or 474. The video client devices 472 and/or 474 may be operable to display shared content, for example, a plurality of content streams concurrently.

In an exemplary operation, the IMRGs 412 and/or 414 may be configured for content sharing services by a service manger, for example, a service manager that is described with respect to FIG. 1. The IMRG 412 and the IMRG 414 may discover each other. The IMRG 412 and/or the IMRG 414 may discover the communication devices 132*d*, 134*c*, 138*c*, 136*d* and/or the video client devices 472 and/or 474. The IMRG 412 and/or the IMRG 414 may receive from the service manager, configuration parameters, for example, content sharing permissions and/or user and/or communication device content sharing profiles for the discovered communication devices.

Content comprising television programming, for example, may be delivered from the service manager to the IMRG 412 for distribution to the video client device 472. The content may be viewed by a user from the video client device 472. The local communication device 132*d* may send a request to the IMRG 412 to receive the same content. In instances when the local communication device 132*d* has permission to receive the same content, the IMRG 412 may communicate the same content to the local communication device 132*d*. Alternatively, a user of the video client device 472 may invite the communication device 132*d* to receive the same content via the IMRG 412. In an exemplary embodiment of the invention, the communication device 132*d* and the video client device 472 may be located in the same building or neighborhood. For example, family members or members of a community may view the same TV programming received by the IMRG 412 concurrently and/or at delayed times utilizing a plurality of communication devices.

In another exemplary embodiment of the invention, one or more of the remote communication devices 134*c*, 138*c*, 136*d* and/or the video client device 474 may be operable to send a request to the IMRG 412 to receive the same content that was received for the video client device 472. In instances when one or more of the remote communication devices 134*c*, 138*c*, 136*d* and/or the video client device 474 have permission to receive the same content; the IMRG 412 may enable the remote communication devices to login to the IMRG to request information about content that is being consumed by the video client device 472. Upon request, the IMRG 412 may communicate the same content and/or information about the content to the remote communication devices. Alternatively, a user of the video client device 472 may invite or request via the IMRG 412 that one or more of the remote communication devices 134*c*, 138*c*, 136*d* and/or the video client device 474 may receive the same content. In instances when one or more of the remote communication devices 134*c*, 138*c*, 136*d* and/or the video client device 474 have permission to receive the same content as the video client device 472, the IMRG 412 may distribute the same content to the remote communication devices via the broadband IP networks 120. For example, a user may view home programming remotely via the IMRG 412 and may share the programming among one or more remote and/or local communication devices.

The IMRGs 412 and/or 414 may each be operable to communicate a plurality of streams of the same content and/or a plurality of streams of different content concurrently to each of one or more of a plurality of local and/or remote communication devices such as the communication device 132*d*, 134*c*, 138*c* and 136*d* and/or the video client devices 472 and/or 474. In addition, the communication device 132*d*, 134*c*, 138*c* and 136*d* and/or the video client devices 472 and/or 474 may be operable to receive and/or display a plurality of streams of content concurrently, from one more IMRGs such as the IMRGs 412 and 414.

Figure 5:
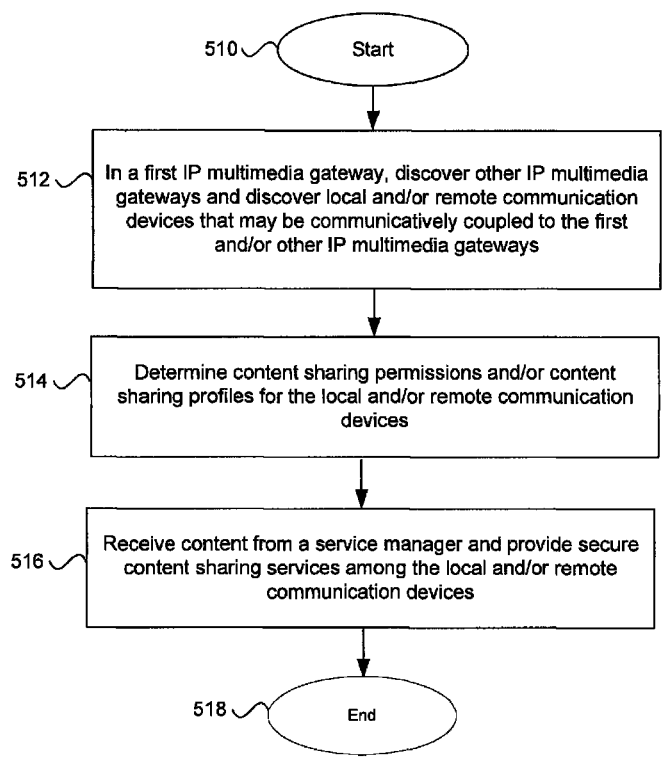
FIG. 5 is a flow chart illustrating exemplary steps that may be performed by an IP multimedia residential gateway for providing content sharing services, in accordance with an embodiment of the invention.

FIG. 5 is a flow chart illustrating exemplary steps that may be performed by an IP multimedia residential gateway for providing content sharing services, in accordance with an embodiment of the invention. Referring to FIG. 5, the exemplary steps may begin at step 510. In step 512, a first IP multimedia gateway, for example, the IP multimedia residential gateway (IMRG) 112, may discover other IP multimedia gateways, for example, the IMRG 114 and may discover local and/or remote communication devices, such as the communication devices 132, 134, 136 and/or 138. The local and/or remote communication devices 132, 134, 136 and/or 138 may be communicatively coupled to the first and/or other IP multimedia gateways. In step 514, the IMRG 112, may determine content sharing permissions and/or content sharing profiles for the local and/or remote communication devices. For example, the IMRG 112 may receive the content sharing permissions and/or profiles from a service manager. In this regard, one or more devices in the IP based application servers 150 and/or the broadband IP networks 120, for example, may comprise the service manager. In step 516, the IP multimedia gateway 112 may receive content from the service manager and may provide secure content sharing services among the local and/or remote communication devices 132, 134, 136 and/or 138. The exemplary steps may end in step 518.

In an embodiment of the invention, in an IP multimedia gateway, one or more content sharing service profiles may be associated with one or more communication devices, for example, the communication devices 132, 134, 136 and/or 138 which may be communicatively coupled to the IP multimedia gateway 112, for example. The one or more content sharing service profiles may be generated by one or more service manager network devices, for example, a device in the IP based application servers 150. Content and/or information about the content, that is received for communication to at least a first of the communication devices, for example, the communication device 132*d*, may be communicated, based on the received content sharing service profiles, to one or more of the other communication devices 138*c*, for example, in response to a request from one or more of the communication device 132, 134, 136 and/or 138. One or more received content streams may be communicated to at least the first communication device 132*d* based on the received content sharing service profiles. The first communication device 132*d* may share the one or more received content streams with at least a second device, 138*c*, for example. The second device 138*c* may share one or more additional content streams with the first communication device 132*d*. Each of the one or more of the plurality of communication devices 132, 134, 136 and 138 that are communicatively coupled to the IP multimedia gateway 112, for example, may be local with respect to the to the IP multimedia gateway or may be remote with respect to the IP multimedia gateway. The content that is received for the communication to the first communication device, for example, the communication device 132d, may be received from the one or more service manager network devices. The one or more received content sharing service profiles may comprise information about one or more of content sharing permissions, content sharing group members, user preferences, communication device capabilities and security profiles, for example. The IP multimedia gateway 112 and/or 412 may be integrated in a set-top-box, a digital television or a video device such as a video projector. In addition, one or more of the plurality of communication devices may be integrated within, for example, the set-top-box, the digital television or the video device such as the video projector; and may be operable to display the content. The request for content sharing may be communicated by the first communication device, for example, the communication device 132d and/or by one or more other of the communication devices 132, 134, 136 and 138. Login access may be enabled for one or more of the communication devices 132, 134, 136 and 138 for submission of the request and/or for requesting information about content that one or more other of the communication devices is operable to consume. Cooperation with one or more other IP multimedia gateways, for example, the IMRG 114, may enable one or more of the discovery of other IP multimedia gateways, the discovery of one or more communication devices 132, 134, 136 and 138 and the communication of the content and/or of the information about the content, based on the received content sharing service profiles.

In another embodiment of the invention, an IP multimedia gateway, for example, the IP multimedia residential gateway (IMRG) 112, may discover one or more other IP multimedia gateways, for example, the IMRG 114 and/or one or more communication devices such as the communication devices 132, 134, 136 and/or 138 that are communicatively coupled to the IMRG 112. One or more content sharing service profiles may be received from one or more service manager network devices. For example, the profiles may be received from a network device within the IP based application severs 150 or within the broadband IP networks 120. The received content sharing service profiles may be generated by one or more of the service manger network devices. Content and/or information about the content may be communicated based on the received content sharing service profiles. The content and/or the information about the content that is received for communication to a first communication device, for example, the communication device 132d, may be communicated to one or more other communication devices, for example, the communication devices 134c and/or 136c, in response to a request from one or more of the communication device 132, 134, 136 and 138. Furthermore, based on the received content sharing service profiles, a plurality of streams of content that is received for communication to one or more communication devices may be communicated to another communication device, for example, to the communication device 132d, in response to one or more requests from one or more of the communication device 132, 134, 136 and 138.

Each of the one or more of the plurality of communication devices 132, 134, 136 and 138 that are communicatively coupled to the IP multimedia gateway 112, for example, may be local with respect to the to the IP multimedia gateway or may be remote with respect to the IP multimedia gateway. The content that is received for the communication to the first communication device, for example, the communication device 132d, may be received from the one or more service manager network devices. The one or more received content sharing service profiles may comprise information about one or more of content sharing permissions, content sharing group members, user preferences, communication device capabilities and security profiles, for example. The IP multimedia gateway 112 and/or 412 may be integrated in a set-top-box, a digital television or a video device such as a video projector. In addition, one or more of the plurality of communication devices may be integrated within, for example, the set-top-box, the digital television or the video device such as the video projector; and may be operable to display the content. The request for content sharing may be communicated by the first communication device, for example, the communication device 132d and/or by one or more other of the communication devices 132, 134, 136 and 138. Login access may be enabled for one or more of the communication devices 132, 134, 136 and 138 for submission of the request and/or for requesting information about content that one or more other of the communication devices is operable to consume. Cooperation with one or more other IP multimedia gateways, for example, the IMRG 114, may enable one or more of the discovery of other IP multimedia gateways, the discovery of one or more communication devices 132, 134, 136 and 138 and the communication of the content and/or of the information about the content, based on the received content sharing service profiles.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing content remotely via one or more IP multimedia residential gateways.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
receiving, by an IP multimedia gateway from a service manager, content requested by a first communication device;
receiving, by the IP multimedia gateway from the service manager, a content sharing service profile for content sharing using the IP multimedia gateway, wherein the content sharing service profile controls content sharing services enabled for a second communication device;
transmitting, by the IP multimedia gateway, the requested content to the first communication device; and
transmitting, by the IP multimedia gateway according to the content sharing service profile received from the service manager, a copy of the content requested by the first communication device to the second communication device.

2. The method according to claim 1, wherein the copy of the content is transmitted responsive to permission being granted to the second communication device from at least one of the first communication device or the service manager.

3. The method according to claim 1, further comprising inviting, by the IP multimedia gateway using the content sharing service profile from the service manager, the second communication device to consume the content before transmitting the copy of the requested content to the second communication device.

4. The method according to claim 1, wherein the content sharing service profile is determined by the service manager and provided to the IP multimedia gateway, and comprises at least one of a content sharing permission, a content sharing group or a device capability.

5. The method according to claim 1, further comprising receiving, by the IP multimedia gateway from the service manager, the content sharing service profile that comprises parameters for controlling content sharing for at least the first communication device and the second communication device.

6. The method according to claim 1, wherein the IP multimedia gateway is integrated in a set-top-box, a digital television, or a video device.

7. The method according to claim 1, wherein the first communication device comprises a video client device that is configured to display the requested content.

8. The method according to claim 1, wherein the second communication device comprises a video client device that is configured to display the copy of the requested content.

9. The method according to claim 1, comprising cooperating with one or more other IP multimedia gateways for:
discovery of the IP multimedia gateway;
discovery of the first communication device;
discovery of the second communication device; or
transmission of the content.

10. A system for communication, the system comprising:
one or more circuits for use in an IP multimedia gateway device, wherein the one or more circuits are configured to:
receive, from a service manager, content requested by a first communication device;
receive, from the service manager, a content sharing service profile for content sharing using the IP multimedia gateway device, wherein the content sharing service profile controls content sharing services enabled for a second communication device;
transmit the requested content to the first communication device; and
transmit, according to the content sharing service profile received from the service manager, a copy of the content requested by the first communication device to the second communication device.

11. The system according to claim 10, wherein the copy of the requested content is transmitted responsive to permission granted to the second communication device from at least one of the first communication device or the service manager.

12. The system according to claim 10, wherein the one or more circuits are further configured to invite, using the content sharing service profile from the service manager, the second communication device to consume the content before transmitting the copy of the requested content to the second communication device.

13. The system according to claim 10, wherein the content sharing service profile comprises at least one of a content sharing permission, a content sharing group or a device capability.

14. The system according to claim 10, wherein the one or more circuits are further operable to receive the content sharing service profile from the service manager.

15. The system according to claim 10, wherein the IP multimedia gateway is integrated in a set-top-box, a digital television, or a video device.

16. The system according to claim 10, wherein the first communication device comprises a video client device that is configured to display the requested content.

17. The system according to claim 10, wherein the second communication device comprises a video client device that is configured to display the requested content.

18. The system according to claim 10, wherein the one or more circuits are configured to cooperate with one or more other IP multimedia gateways for:
discovery of the IP multimedia gateway;
discovery of the first communication device;
discovery of the second communication device; or
transmission of the content.

19. A non-transitory machine-readable storage, having stored thereon a computer program having at least one code section for communication, the at least one code section executable by a machine for causing the machine to perform:
receiving, by an IP multimedia gateway from a service manager, content requested by a first communication device;
receiving, by the IP multimedia gateway from the service manager, a content sharing service profile for content sharing using the IP multimedia gateway, wherein the content sharing service profile controls content sharing services enabled for a second communication device;
transmitting, by the IP multimedia gateway, the requested content to the first communication device; and
transmitting, by the IP multimedia gateway according to the content sharing service profile received from the service manager, a copy of the content requested by the first communication device to the second communication device.

20. The non-transitory machine-readable storage according to claim 19, further causing the machine to invite the second communication device to consume the content before transmitting the copy of the requested content to the second communication device.

\* \* \* \* \*